Feb. 11, 1969

R. J. LEE ETAL 3,426,646

BURR-REMOVING MACHINES

Filed March 1, 1967

INVENTORS
RICHARD J. LEE
JEROME F. GOLNER

BY

*Morsell & Morsell*

ATTORNEYS

United States Patent Office 3,426,646
Patented Feb. 11, 1969

3,426,646
BURR-REMOVING MACHINES
Richard J. Lee, Rte. 2, Hartford, Wis. 53027, and Jerome F. Golner, W 269 N1552 Highway G, Pewaukee, Wis. 53072
Filed Mar. 1, 1967, Ser. No. 619,845
U.S. Cl. 90—24        8 Claims
Int. Cl. B23d 1/18, 1/20

ABSTRACT OF THE DISCLOSURE

To remove the unavoidable little protrusion or burr that is formed on a workpiece or part as a result of automatic screw machine or other machining operations thereon, the invention comprises a power-driven, high-speed cutting tool holder and specially-formed cutting tool designed to remove the burr instantly with a minimum of unnecessary gouging or scarring to the surface of the part.

BACKGROUND OF THE INVENTION

Field of the invention

The present invention pertains to machined parts, particularly to metal parts formed on a screw machine or the like, and provides a power tool for removing burrs from such parts.

Description of the prior art

Heretofore, protrusions or burrs have been removed from machined parts by means of a conventional grinding wheel, which tends to gouge and scar the part, or such protrusions have been manually removed by means of a punch or chisel, which is tedious and time-consuming.

SUMMARY OF THE INVENTION

The present invention provides a power-driven burr-removing tool including a pivotally-mounted tool holder arm which is rocked up and down in a short, arcuate stroke and which arm carries a tool having its cutting face convexly curved in a plane transverse to the plane of movement of said arm. Thus there is provided a shallow, curved cutting action which permits an operator to manually urge a machined part against said oscillating tool to remove a burr or protrusion thereon without gouging or scarring the face of said part.

In addition to minimizing damage to the part, the present invention is also easier to use than conventional grinding wheels, and requires minimal skill.

A further advantage of the present invention is that it is readily adjustable to accommodate machined parts or workpieces of various sizes and shapes.

Still further advantages of the present invention are that it is sturdy and dependable in construction, it is simple and reliable in operation, and it is otherwise particularly well adapted for its intended purposes.

BRIEF DESCRIPTION OF THE DRAWING

In the drawing, wherein the same reference numerals designate the same or similar parts in both of the views.

DESCRIPTION OF THE PREFERRED EMBODIMENTS

Figure 1:
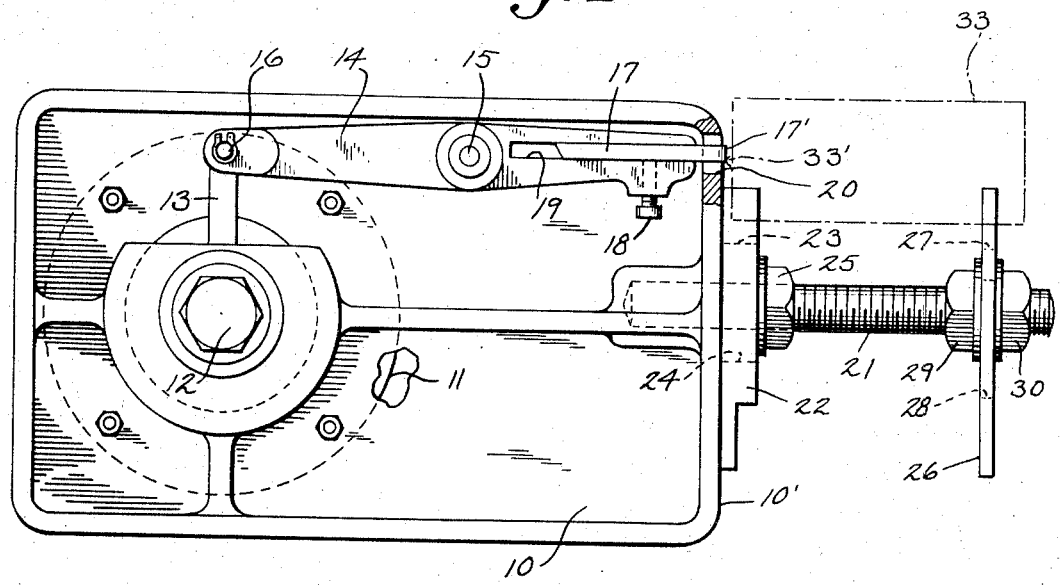
FIG. 1 is a side elevational view of the complete burr-removing machine, a workpiece being shown in broken lines.

Referring now more particularly to FIG. 1 of the drawing, the numeral 10 designates the supporting housing, and carried by said housing is an electric motor 11 having a drive shaft 12. It has been found that a 1/10 horsepower motor having about 1500 r.p.m. performs satisfactorily, combining adequate power with economical operation, but the size and capacity of said motor can be varied as desired, and the invention is not to be limited in this respect. Mounted on the motor shaft 12 is an eccentric or cam (not shown) and projecting upwardly therefrom is a connecting rod 13 which is reciprocable up and down in a short stroke through its connection with said cam and motor shaft.

An elongated horizontal arm 14, hereinafter referred to as the tool holder arm, is pivotally mounted on the housing intermediate its length, as at 15, and the rearward end of said tool holder arm is secured to the reciprocable connecting rod 13 by means of a suitable connector 16. During the operation of the present machine said arm 14 is rocked about its pivot point 15, as will be hereinafter described in greater detail.

The outer portion of said elongated arm 14 is provided with a longitudinal slotted cutout 19 opening in its forward end, and mounted therein is a cutting tool 17 which is removably and longitudinally adjustably retained within said tool holder arm by means of a set screw 18. The outer end 17' of said cutting tool extends forwardly of the holder 14 and projects a short distance beyond the front face 10' of the housing, there being an opening 20 in said housing front wall through which said tool end projects.

Figure 2:
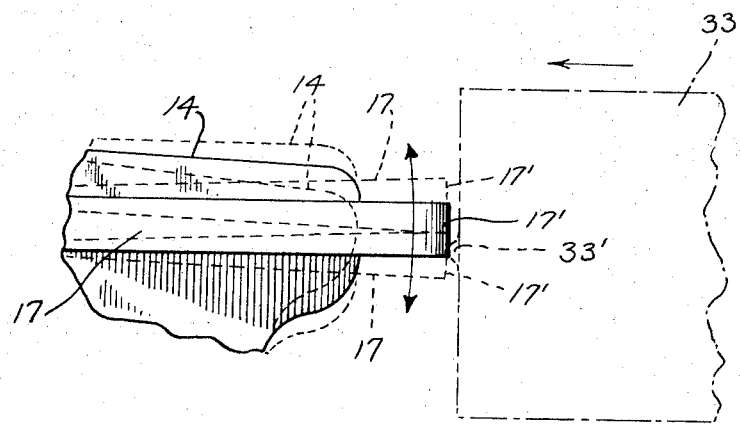
FIG. 2 is an enlarged and exaggerated fragmentary elevational view illustrating the cutting action of the tool.

As best appears in FIG. 2, the outer projecting end or cutting face 17' of the tool 17 is convexly curved in a plane transverse to the plane in which said tool oscillates, and in accordance with the preferred form of the present invention said cutting face is curved on an arc having a radius equal in length to the distance between said end face and the tool holder pivot point 15. FIG. 2 of the drawing is enlarged and exaggerated in order to more clearly illustrate the tool motion, but in the preferred embodiment of the invention the tool is designed to oscillate only about an eighth of an inch in an arc whose radius is three inches, the face of said tool being transversely curved in an arc whose radius is also three inches. These dimensions are not critical, however, and can be varied as required for a particular type and size of workpiece.

Projecting from the forward end of the housing 10 intermediate the height thereof is a threaded horizontal shaft 21, and mounted on the inner end thereof, abutting against the face 10' of said housing, is a first workpiece-supporting element 22. Said supporting element has a V-shaped cutout 23 opening in its upper edge within which the workpiece is designed to seat, and is also provided with an elongated slotted opening 24 through which said horizontal shaft 21 projects, thus permitting vertical adjustment of said supporting member on said shaft. A nut 25 on said shaft is engageable against said first supporting element 22 to retain the same in a desired position of vertical adjustment.

Carried on the outer end of said elongated shaft 21 is a second workpiece-supporting element 26 having a V-shaped cutout or seat 27 in its upper edge, and having an elongated slot 28 through which said shaft 21 projects, thus permitting vertical adjustment of said second support element. Nuts 29 and 30 are positioned on the opposite sides of said supporting element 26 and are turnable to permit vertical and/or longitudinal adjustment of said element.

In addition to the V-shaped cutouts or seats formed in the upper edges of the supporting elements 22, 26, differently-angled V-shaped cutouts can also be formed in the bottom edges of said elements, whereby said elements can be inverted to provide a different angular arrangement to accommodate workpieces of varying sizes. It is to be understood, of course, that while said V-shaped cutouts are particularly well suited for receiving and retaining cylindrical workpieces, this is not a critical feature of the invention and supporting elements of other designs can be used for workpieces of other cross-sectional shapes without departing from the spirit and intended scope of the invention.

In the use of the present invention, a workpiece such as the cylindrical metal part 33 (FIG. 1) is supported by and between the spaced support elements 22 and 26, and the operator manually urges said part toward the cutting tool 17. As hereinabove described, the present invention is designed for use with machined parts having a protruding nub or burr 33' (FIG. 2) at the center thereof, which is unavoidable due to the cutoff operation when the part has been produced by an automatic screw machine or certain other machining operations. It is to be understood, incidentally, that while said burr-removing machine is intended principally for use with metal workpieces, it can also be advantageously employed with parts formed of wood or other materials, including plastics, and the invention is by no means to be limited or confined in this respect.

In setting up the burr-removing machine comprising the present invention, the vertically-adjustable supporting elements 22, 26 are set so that the burr 33' on the metal part is aligned with said cutting tool. It is contemplated that the present invention will ordinarily be utilized in conjunction with a high volume manufacturing operation, wherein a number of identical parts require burr removal, and once said machine has been adjusted and set for a particular part it will not need readjustment.

Referring now to FIG. 2 of the drawing, when the machine is in operation the tool-holding arm 14 is rocked up and down at a high speed about the pivot point 15, the tool 17 therein oscillating in short, arcuate strokes, and to remove the burr 33' from the part 33 the operator merely manually urges said part to a position wherein said burr will be engaged by said rapidly-moving tool. As hereinabove described, the end face 17' of said cutting tool is curved transversely to its plane of movement, and said motion and tool shape coact to provide a shallow, curved cutting action that functions to instantly and completely grind or cut off said burr without noticeably gouging or scarring the face of the part.

The actual cutting surface presented by the tool 17 in the present invention, due to its arcuate motion and transverse curvature, is comparable to that provided by a spherical surface, with minimal surface contact between said tool face and the part. If there is any marring of the part it is merely a minute dishing of the surface which is practically invisible to the eye. The amount of metal removed is governed by the dimensions of the tool travel and shape, and can be varied to suit the job. In addition, the longitudinal adjustability of the tool 17 within the tool holder permits said tool to be accurately set to project only a predetermined distance beyond the face 10' of the housing, thereby limiting the depth of the cut as desired.

In addition to minimizing scarring of the part or workpiece, it has been found that with the present invention even an inexperienced operator can remove burrs as fast as he can grasp and position successive workpieces, thus providing greatly increased speed and efficiency as compared to the use of a conventional grinding wheel for the same purpose. Moreover, in lieu of manually feeding the workpieces toward the cutting tool it is contemplated that for high volume operations the workpieces can be fed mechanically, thus further facilitating the job of the operator.

While the present invention is particularly well suited for removing burrs from flat surfaces, as described, the arcuate cutting action of the present device also permits it to be used on workpieces having concave or convex faces with far better results than can be obtained with a grinding wheel.

From the foregoing description it will be seen that the present invention provides a new and improved burr-removing tool having several advantages over the prior devices used for the same purpose. Said power-driven tool is much faster and more efficient than manually removing burrs with a punch or chisel, of course, and also requires considerably less skill. In addition, the present invention is superior to conventional grinding wheels because it is faster, it requires less skill, and said novel tool does not form a groove or otherwise scar the face of the machined part.

Another important advantage of the present invention that has not heretofore been mentioned is that said burr-removing machine is relatively safe. Because of its design, wherein the cutting tool projects only a fraction of an inch beyond the housing and moves in a very short stroke, it would be very difficult for a workman to injure himself thereon while removing burrs from machined parts, and a serious maiming injury is impossible. The result is a novel burr-removing device that is not only fast and efficient, but which is safe.

It is to be understood, of course, that while a preferred embodiment of the invention has been illustrated and described herein, numerous variations or modifications therein are possible. What is intended to be covered herein is not only the illustrated form of said invention, but also any and all variations or modifications thereof as may come within the spirit of said invention, and within the scope of the following claims.

What we claim is:

1. A machine for removing protruding burrs from workpieces, comprising: a housing; a motor associated with said housing; a tool holder arm pivotally mounted on said housing, said arm having a forward end; means operatively connecting said pivotal tool holder arm to said motor whereby the forward end of said arm is rapidly oscillated in a short, arcuate stroke during operation of said motor; and a cutting tool carried by and projecting from the forward end of said tool holder arm, the forward end of said tool being provided with a cutting face, said tool being removably and longitudinally-adjustably carried by said tool holder arm, said housing being provided with a front face and the forward end of said adjustable tool projecting there-beyond, whereby said tool is adapted to remove a burr engaged thereby during oscillating movement of said tool with said tool holder.

2. The burr-removing machine recited in claim 1 wherein said tool holder and tool oscillate in one plane and said cutting face being convexly curved in a plane transverse to the plane of movement of said tool.

3. The burr-removing machine recited in claim 2 wherein said curved cutting tool face is formed on an arc having a radius substantially equal in length to the distance between said cutting face and the pivot point of said tool holder arm.

4. The burr-removing machine recited in claim 1 wherein said tool holder arm has a rearward end, and wherein said pivot mounting is located intermediate the length of said arm.

5. The burr-removing machine recited in claim 4 wherein the means connecting said tool holder arm to said motor include a cam-actuated reciprocable connecting rod extending between said motor and the rearward end of said tool holder arm and adapted to rock said arm about said pivot mounting during operation of said motor.

6. The burr-removing machine recited in claim 1 and having workpiece-supporting means carried on and projecting forwardly of said housing.

7. The burr-removing machine recited in claim 8 wherein said supporting means includes an elongated threaded shaft having a workpiece-retaining element adjustably mounted thereon.

8. The burr-removing machine recited in claim 7 wherein said workpiece-retaining element is provided with an edge having a V-shaped cutout therein within which a workpiece can be seated, and having an elongated slotted opening through which said shaft projects, said slotted opening permitting both axial and lateral adjustment of said element relative to said shaft, and there being a nut movably carried on said threaded shaft adapted to abut said workpiece-retaining element to secure the same in a selected position of adjustment.

References Cited

UNITED STATES PATENTS

| 2,975,265 | 3/1951 | Kaiser et al. | 90—24.05 |
| 3,074,323 | 1/1963 | Holmes | 90—24.01 |

ANDREW R. JUHASZ, *Primary Examiner.*

G. WEIDENFELD, *Assistant Examiner.*